US008154137B1

(12) United States Patent
Flegel

(10) Patent No.: US 8,154,137 B1
(45) Date of Patent: Apr. 10, 2012

(54) PORTABLE POWER SOURCE HAVING DETACHABLY MOUNTED ACCESSORY

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 254 days.

(21) Appl. No.: 12/038,542

(22) Filed: Feb. 27, 2008

(51) Int. Cl.

| | |
|---|---|
| ***F02B 63/04*** | (2006.01) |
| ***H02K 7/18*** | (2006.01) |
| *B60L 1/02* | (2006.01) |
| *F01K 15/00* | (2006.01) |
| *F01K 17/02* | (2006.01) |
| *F02C 6/00* | (2006.01) |
| *F02C 6/18* | (2006.01) |

(52) U.S. Cl. ............................. 290/1 A; 290/1 B; 290/2

(58) Field of Classification Search .................. 290/1 A, 290/1 B, 2

See application file for complete search history.

(56) References Cited

U.S. PATENT DOCUMENTS

| | | | | | |
|---|---|---|---|---|---|
| 3,749,907 | A * | 7/1973 | Allmand | 362/371 |
| 4,136,432 | A * | 1/1979 | Melley, Jr. | 29/469 |
| 4,399,080 | A * | 8/1983 | Swank | 261/80 |
| 4,482,125 | A * | 11/1984 | Ziernicki | 248/604 |
| 4,732,360 | A * | 3/1988 | Bodenheimer | 248/645 |
| 4,835,405 | A * | 5/1989 | Clancey et al. | 290/1 A |
| 4,927,104 | A * | 5/1990 | Miller | 248/97 |
| 5,067,065 | A * | 11/1991 | Dahlgren | 362/369 |
| 5,181,541 | A * | 1/1993 | Bodenheimer | 137/899 |
| 5,364,059 | A * | 11/1994 | Kinoshita et al. | 248/584 |
| 5,929,611 | A * | 7/1999 | Scott et al. | 322/46 |
| D414,460 | S * | 9/1999 | Hughes | D13/110 |
| 6,364,328 | B1 * | 4/2002 | Stahler, Sr. | 280/47.18 |
| 6,758,482 | B2 * | 7/2004 | Stallbaumer | 280/47.27 |
| 6,938,905 | B1 * | 9/2005 | Tsai | 280/47.29 |
| D533,770 | S * | 12/2006 | Schnackenberg | D8/354 |
| 7,195,255 | B1 * | 3/2007 | Tsai et al. | 280/47.29 |
| 7,235,741 | B2 | 6/2007 | Schnackenberg | 174/72 A |
| D546,761 | S * | 7/2007 | Schnackenberg | D13/122 |
| 7,449,793 | B2 * | 11/2008 | Cho et al. | 290/1 A |
| 7,513,511 | B2 * | 4/2009 | Chaseateau | 280/47.27 |
| 7,642,665 | B2 * | 1/2010 | Konop et al. | 290/1 A |
| 7,673,589 | B2 * | 3/2010 | Shimada et al. | 123/2 |
| 7,705,478 | B2 * | 4/2010 | Hirose et al. | 290/1 A |
| 7,735,801 | B1 * | 6/2010 | Flegel | 248/609 |
| 7,743,739 | B2 * | 6/2010 | Kochi et al. | 123/2 |
| 7,797,901 | B2 * | 9/2010 | Near | 52/481.1 |
| 2003/0062700 | A1 * | 4/2003 | Stallbaumer | 280/47.27 |
| 2004/0097912 | A1 * | 5/2004 | Gonnering | 606/34 |
| 2005/0151374 | A1 * | 7/2005 | Ambrose | 290/1 A |
| 2006/0081392 | A1 * | 4/2006 | Schnackenberg | 174/72 A |
| 2007/0199732 | A1 * | 8/2007 | Schnackenberg | 174/135 |

OTHER PUBLICATIONS

PowerStay, Installation Instructions for Parallel Power Kit model 30501 and 73131, 1 page, internet dated Aug. 22, 2003.

PowerStay, Mounting Instructions for Parallel Power Kit model 30501A and 73131A, 2 pages, internet dated Jun. 2004.

Printout from website for Tele-Lite, showing a bracket for mounting a light directly to a generator, showing a bracket as used in an embodiment of the present invention. This bracket was on sale at least as early as Oct. 14, 2004, Apr. 28, 2005.

* cited by examiner

*Primary Examiner* — Pedro J Cuevas

(74) *Attorney, Agent, or Firm* — Boyle Fredrickson, S.C.

(57) ABSTRACT

A generator has a receiver adapted to receive an electrical accessory in a manner that allows the electrical accessory to be quickly removed when desired by a user. The receiver allows an electrical accessory, such as a parallel connection kit, transfer switch, or work light, to be securely mounted to the generator, but removed when desired without the need for any tools.

14 Claims, 7 Drawing Sheets

PORTABLE POWER SOURCE HAVING DETACHABLY MOUNTED ACCESSORY

BACKGROUND OF THE INVENTION

This invention relates generally to power generation devices and, more particularly, to an electric generator to which an electrical accessory may be temporarily attached or mounted.

Power generators may be characterized as either fixed or portable. A fixed power generator is commonly used as a back-up or emergency power supply for a dwelling or other building during main or utility power failure. Such fixed power generators are typically large and heavy, and, as such, do not lend themselves to convenient portability. Portable power generators, on the other hand, are much smaller and lighter. These power generators are typically used in light industrial applications or in a variety of consumer uses, such as in camping applications or to power a relatively small number of circuits in a building during a utility power outage.

Because of their smaller size and weight, portable generators, in some situations, may be unable to provide the power demanded of a particular load. Therefore, parallel connection kits have been developed to enable two generators to be connected in parallel to provide a single power output with sufficient current for the load while maintaining the output voltage of the paired generators the same as for a single generator. An example of a parallel connection kit is illustrated in U.S. Pub. No. 2006/0081392, which discloses a parallel connection kit that is mounted on an attachment frame that is rigidly affixed to a generator.

While the parallel connection kit disclosed in the /392 publication overcomes some of the drawbacks of previous parallel connection kits, i.e., sprawling wires, leads, and circuitry boxes, the rigid connection of the input box adds to the size and weight of the generator. This can be particularly troublesome for a user since the permanent affixation of the parallel kit requires that the parallel kit be transported when the generator is transported, even though the parallel kit may not be necessary. Additionally, the size of parallel connection kit and the permanency of the connection significantly limits the ability to mount other accessories to the generator, such as a transfer switch, work light, etc.

SUMMARY OF THE INVENTION

The present invention is directed to a portable generator having a receiver carried by the generator, which is adapted to receive an electrical accessory in a manner that allows the electrical accessory to be quickly and easily removed when desired by a user. The receiver thus allows an electrical accessory, such as a parallel connection kit or a work light, to be securely mounted to the generator, but removed without tools when desired. As such, the portability of the generator is not permanently affected by the electrical accessory.

In one embodiment, the receiver is configured to slidably receive a mounting clip carried by the electrical accessory. The clip is engaged with the receiver in a manner such that the mounting of the electrical accessory to the receiver does not require any screws or similar fasteners. Since fasteners are not required to mount the electrical accessory, removal of the mounting clip and thus detachment of the electrical accessory likewise does not require the removal of any fasteners. This construction allows an electrical accessory to be attached to and detached from the generator in a tool-less manner.

In another embodiment, the receiver includes a bracket mounted to the faceplate of the generator. The bracket is spaced from the faceplate to allow the mounting clip of the electrical accessory to be slid between the bracket and the faceplate.

In another embodiment, a cushioning material may be mounted to an interior surface of the receiver, and is configured to bear on the generator to dampen any vibrations between the generator and the electrical accessory.

Various other features and advantages of the present invention will be made apparent from the following detailed description and the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

The present invention will be described with respect to a portable, gasoline-powered generator to which electrical accessories may be mounted by a user, when desired, and then removed when not being used. While three exemplary accessories will be shown and described, it is recognized that these accessories are merely representative and that other accessories different from those shown may also be used. Moreover, it is recognized that the generator and accessories may be packaged and sold together as a bundle or kit, or that the generator and accessories may be commercially available separately. Additionally, while the invention is particularly suitable for relatively small, portable generators, it is understood that the particulars of the invention may also be applicable with non-portable generators. Similarly, the invention is not limited to gasoline-powered generators, and may be used in conjunction with any type of generator or other stand-alone source for producing electrical power.

Figure 1:
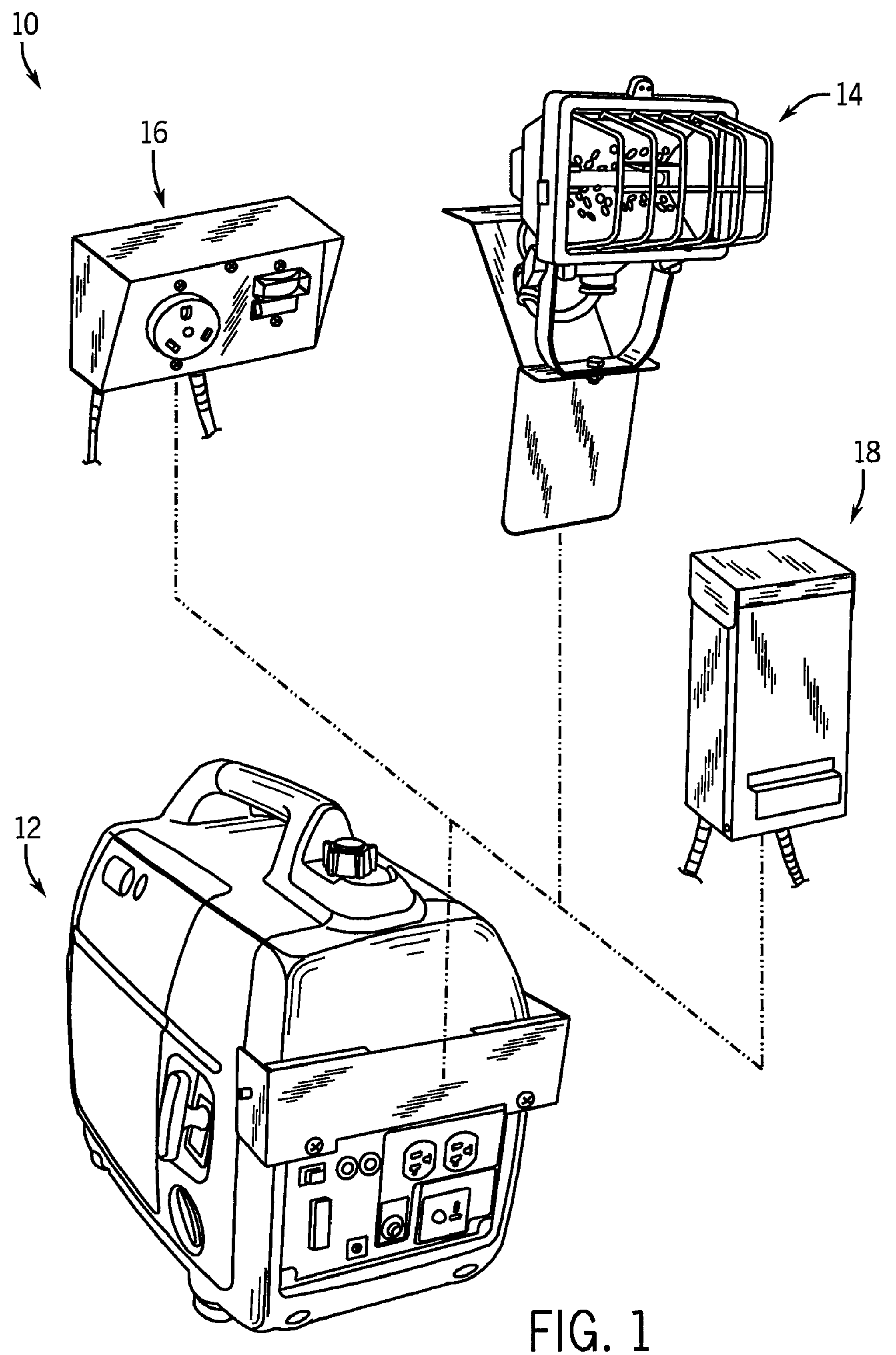
FIG. 1 is an isometric view of an electric generator and accessories that may be mounted to the generator in accordance with one aspect of the present invention.

FIG. 1 shows a portable generator and a number of accessories, shown generally at 10, which in the illustrated embodiment includes a portable generator 12 adapted to removably receive one or more electrical accessories, such as a work light 14, a parallel connection device 16, and/or a transfer switch 18. The portable generator 12 is operative as a stand-alone device or with any of the accessories. As will be explained, in a preferred embodiment, when an accessory is to be used in conjunction with the generator 12, the accessory may be mounted to the generator. As will also be explained, the accessory is mounted in a manner that does not require any fasteners to secure the accessory to the generator 12. Thus, a user may quickly attach or detach an accessory to or from the generator 12.

Figure 2:
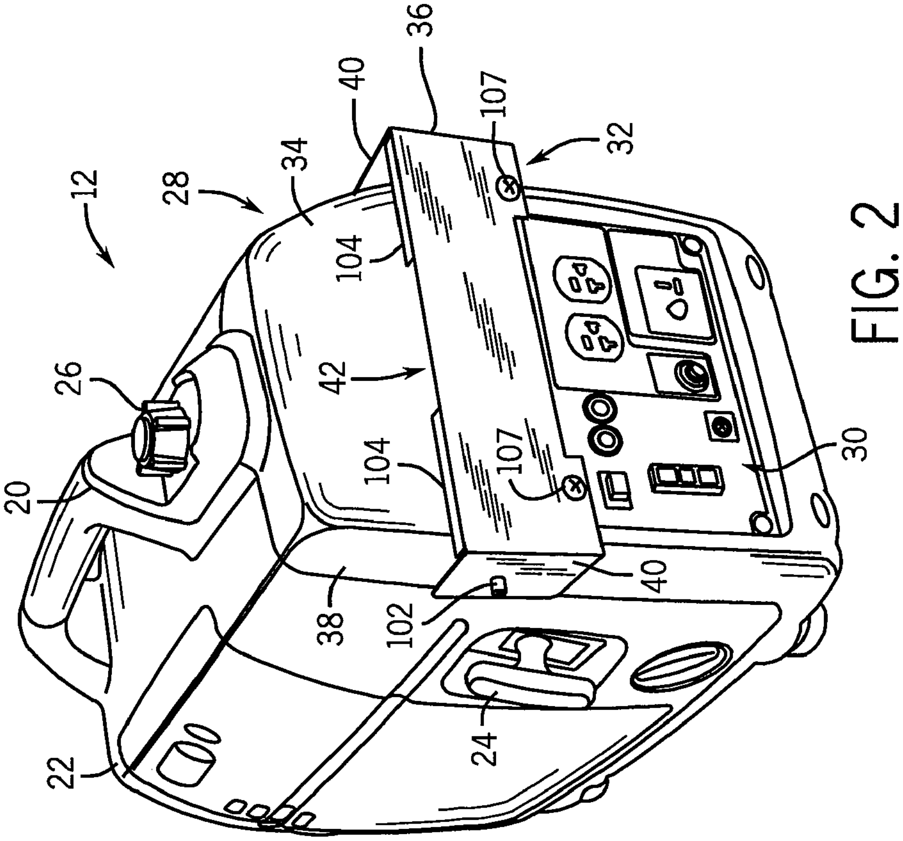
FIG. 2 is an isometric view of the electric generator shown in FIG. 1.

With additional reference to FIG. 2, generator 12 includes a handle 20 to facilitate handling. The generator 12 includes a housing 22 to which the handle 20 is coupled, or the handle 20 may be integrally formed with the housing 22. The housing 22 provides an enclosure for the electrical and mechanical components used to provide an electrical output, in a manner as is known. In the illustrated embodiment, the generator 12 is an engine-driven generator and includes an engine (not shown) that may be started in a conventional manner using a pull start 24. As is customary for engine-driven generators, generator 12 has a fuel reservoir (not shown) that may be replenished using a fuel cap 26. The front of the housing 22 has a faceplate 28 that supports an interface panel 30 including various connectors, terminals, indicators, and switches, as is customary in the art.

The generator 12 also has a bracket 32 mounted across the front 34 of the faceplate 28. The bracket 32 includes a connector plate 36 that traverses the front 34 of the faceplate 28 and is fixedly attached to sidewalls 38 (one of which is shown in the figures) of the faceplate 28. The bracket 32 is attached to the sidewalls 38 through a pair of mounting arms 40 of sufficient length such that the connector plate 36 is laterally offset from the front 34 of the faceplate 28. The lateral offset creates a gap 42 between the backside of the connector plate 36 and the front 34 of the faceplate 28. As will be described further below, this gap 42 is used to receive a mounting clip of an accessory when the accessory is mounted to the generator 12.

Figure 3:
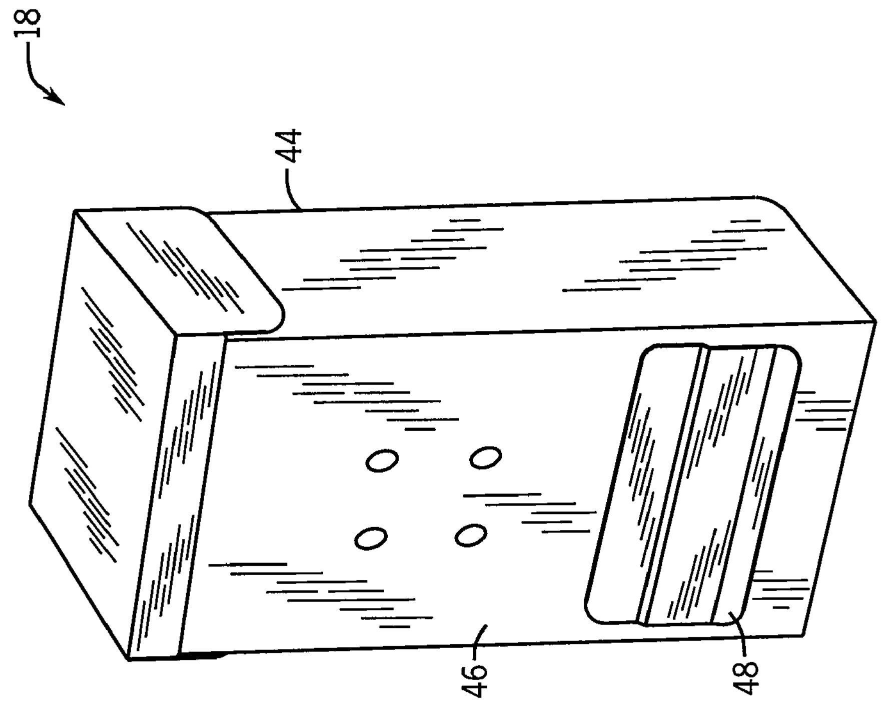
FIG. 3 is an isometric view of an accessory, in the form of a transfer switch, adapted for use with the electric generator shown in FIGS. 1 and 2 according to one aspect of the present invention.
Figure 5:
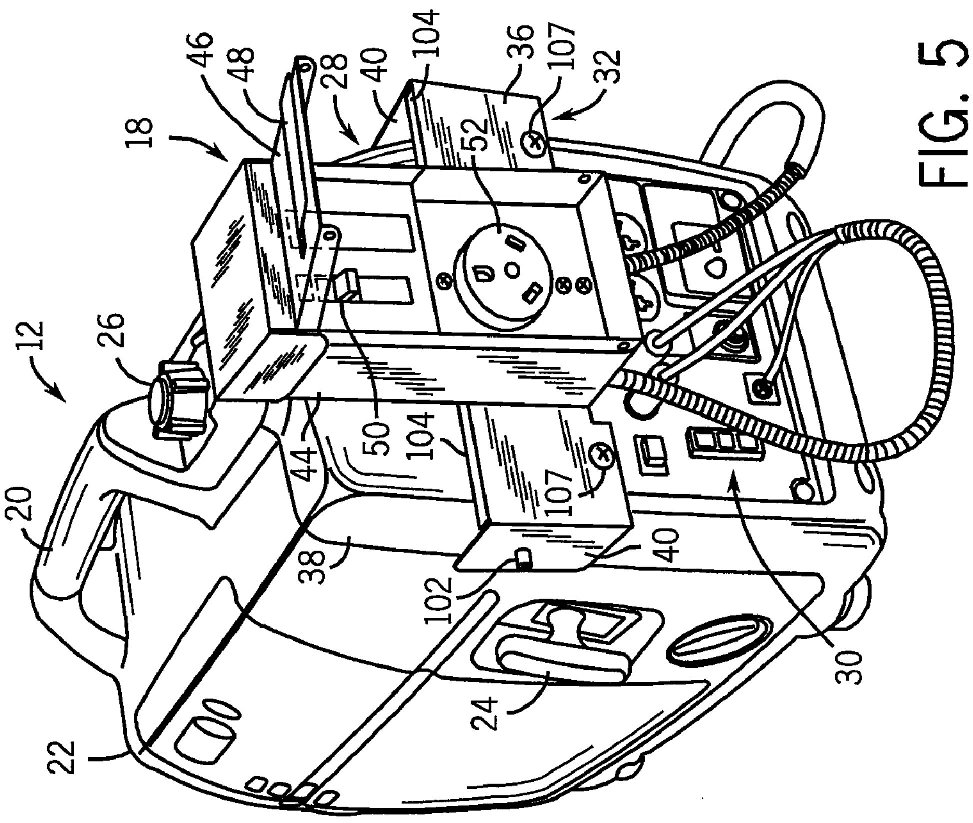
FIG. 5 is an isometric view of the electric generator and the transfer switch similar to FIG. 4 showing an access cover of the transfer switch in an open position.

Referring now to FIGS. 1 and 3, one of the accessories contemplated for mounting to generator 12 is a transfer switch 18. Transfer switch 18 includes a switch box 44 having a cover plate 46 that may be lifted using a handle 48. Cover plate 46 is designed to prevent access to switch 50 and outlet 52, both of which are shown in FIG. 5, when the transfer switch 18 is not in use. As is known in the art, transfer switches such as switch 18 is designed to transfer a load from a main or utility power source to an auxiliary power source during main power interruption. Transfer switch 18 provides a similar function when connected to suitable terminals of the generator 12, as shown in FIG. 5, and connected to a load via outlet 52.

Figure 4:
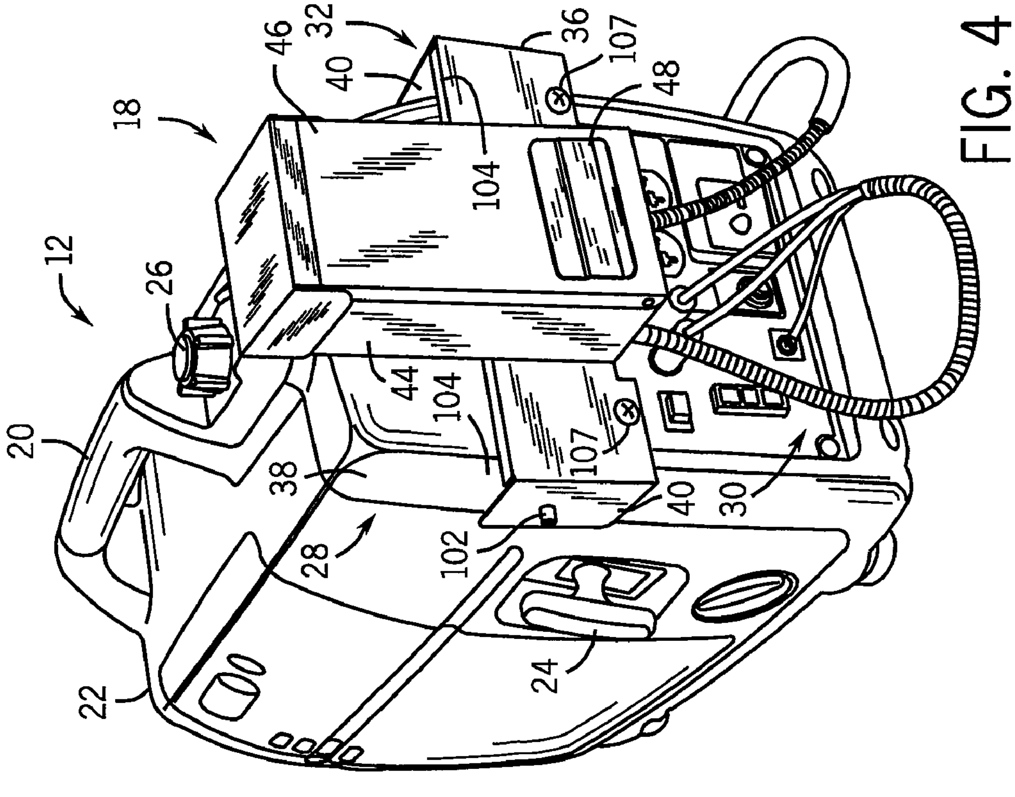
FIG. 4 is an isometric view of the electric generator shown in FIGS. 1 and 2 with the transfer switch shown in FIG. 3 mounted thereto according to an aspect of the present invention.

As shown in FIGS. 4 and 5, transfer switch 18 is adapted to be mounted to bracket 32. If desired, the transfer switch 18 may be maintained in the mounted position, such as shown in FIG. 4, even when not in use, i.e. when cover plate 46 closed, or when in the operative position, shown in FIG. 5, i.e. when cover plate 46 open. As will be described, the transfer switch 18 may be mounted to bracket 32 without requiring any fasteners or tools. This allows a user to quickly attach and detach the transfer switch 18 to and from the generator 12. Although the portability characteristics, e.g., size and weight, of the generator 12 are affected when the transfer switch 18 is mounted to bracket 32, the connection of the transfer switch 18 to the bracket 32 allows the transfer switch 18 to be transported with the generator 12 as a single unit.

Figure 6:
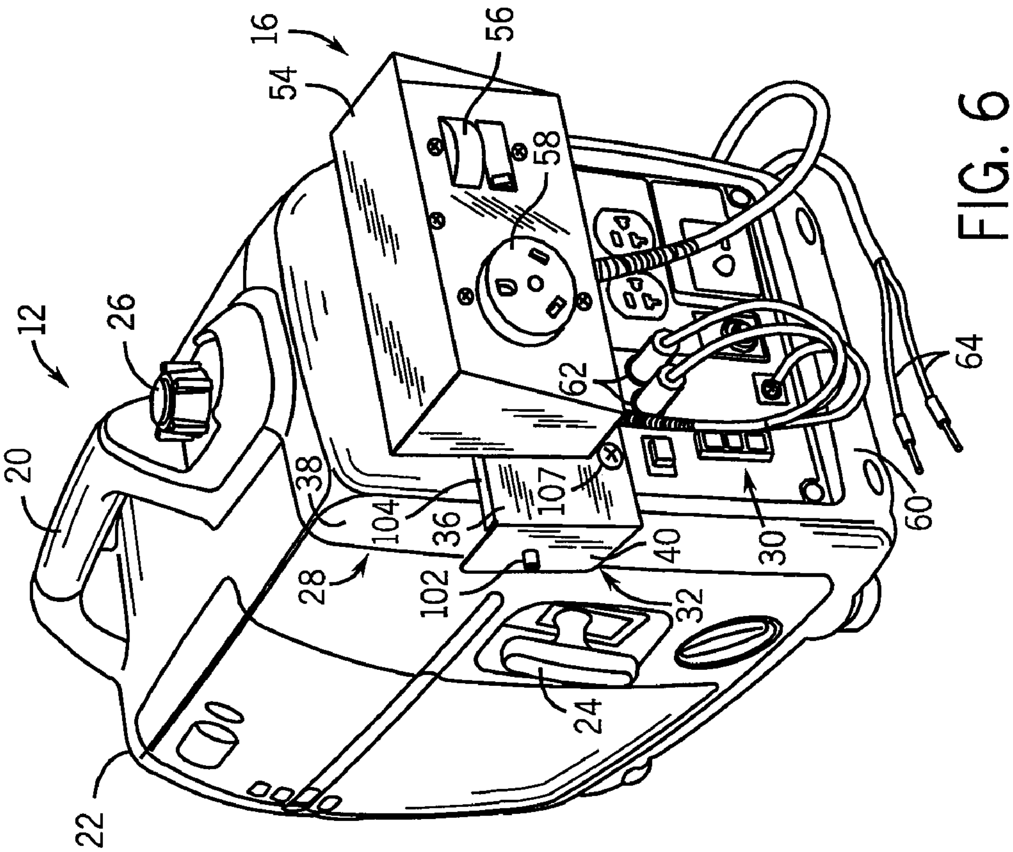
FIG. 6 is an isometric view of the electric generator shown in FIGS. 1 and 2 with a parallel connection device mounted thereto according to an aspect of the present invention.

Referring now to FIG. 6, a parallel connection device 16 is shown mounted to generator 12. The parallel connection device 16, as is known in the art, includes a control box 54 that includes a power meter 56 and a power outlet 58. The parallel connection device 16 includes a first pair of leads 60 that interconnect with corresponding sockets 62 of the generator 12 and a second pair of leads 64 that interconnect with corresponding sockets (not shown) of another generator (not shown) to be connected with generator 12 in parallel, in a manner as is known. The parallel connection device 54 may then combine the power outputs of the paired generators to provide a current output approximately doubled that of a single generator but with the voltage output of a single generator. Thus, for larger loads having a current draw greater than that which can be provided by generator 12 alone, a second generator (not shown), similar to generator 12, may be connected in parallel therewith to meet the power requirements for the load.

Figure 7:
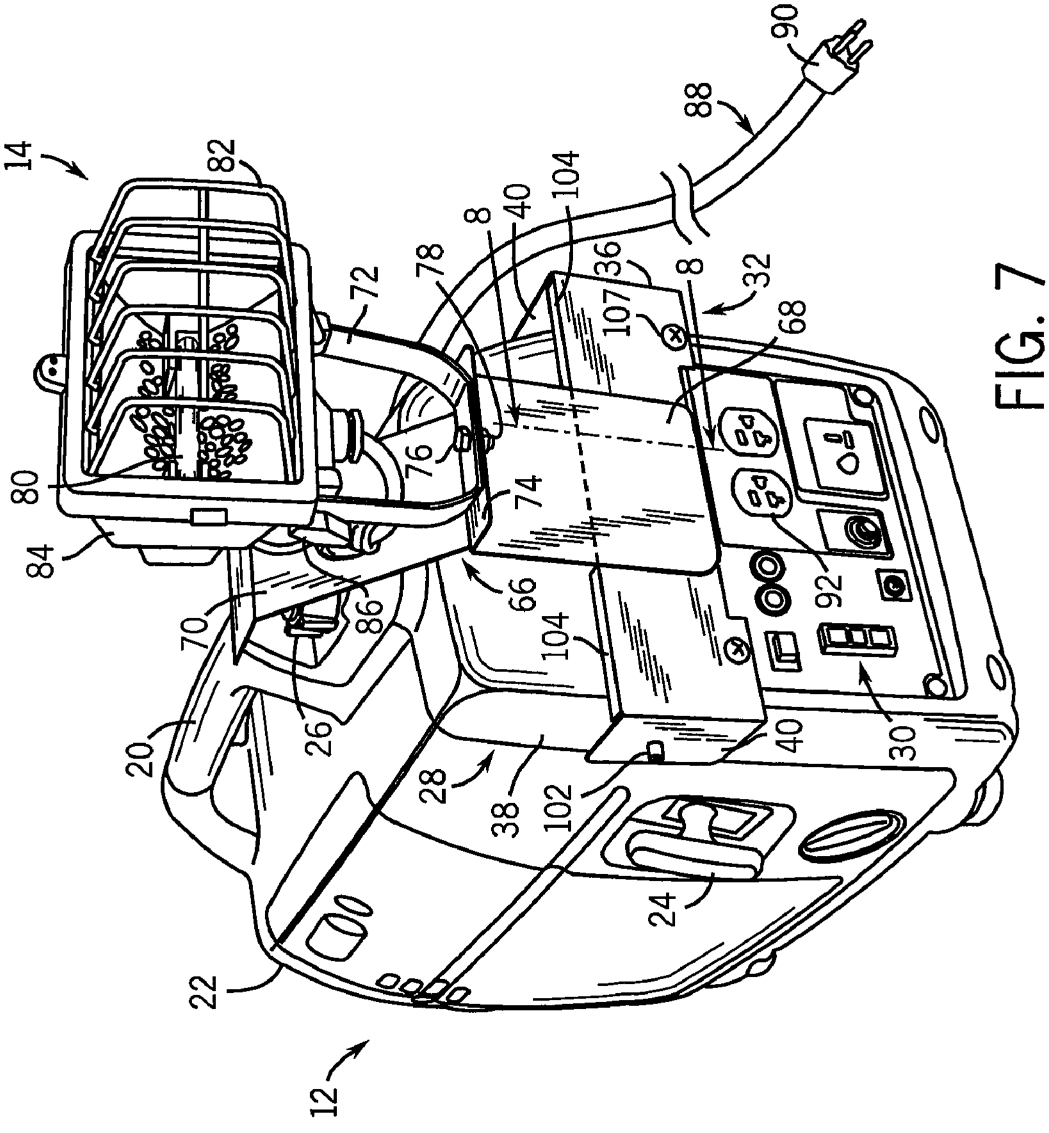
FIG. 7 is an isometric view of the electric generator shown in FIGS. 1 and 2 with an accessory, in the form of a work light, mounted thereto according to an aspect of the present invention.

The parallel connection device 54 is mounted to the same bracket 32 to which transfer switch 18 may be mounted, as shown in FIGS. 4-5, or to which work light 14 may be mounted. As shown in FIG. 7, work light 14 is bolted to and thus carried by a support assembly 66 that includes an upstanding support plate 68 and an angled support plate 70 integrally formed with upstanding support plate 68. The work light 14 has a U-shaped bar 72 that is bolted to a lip 74 of the upstanding support plate 68 using a conventional bolt 76 and locking nut 78. The work light 14 includes a filament 80 and associated circuitry, as is known in the art, encased by a cage 82 coupled to housing 84. The U-shaped bar 72 is coupled to and extends from housing 84. In one embodiment, the housing 84 may be pivoted relative to U-shaped bar 72 at handle joint 86, in order to enable a user to change the angle at which light is emitted. The work light 14 further includes a power cord 88 having a plug 90 that may be inserted into a suitable socket, such as socket 92, of the generator 12 so that illuminating power is delivered to the work light 14.

The generator 12 is constructed to support each of the accessories discussed above, e.g., work light 14, parallel connection device 16, and transfer switch 18, when properly mounted to bracket 32. As shown in FIG. 8A, each accessory has a clip 94 mounted to or otherwise integrally formed with the backside 96 of the electrical accessory 14, 16, or 18. The clip 94 has a downwardly extending arm 98 that terminates in a tongue 100 that is angled slightly outwardly from the arm 98. The clip 94 is designed such that the arm 98 naturally rests against backside 96 of the accessory. Thus, when the clip 94 is engaged with bracket 32, the arm 98 will be slightly displaced outwardly such that connector plate 36 is received between the arm 98 and the backside 96 of the accessory. The bias of the arm 98, however, is such that clip 94 is locked into place over bracket 32. Tongue 100 provides an interface to ease deflection of arm 98 by the connector plate 36 when the clip 94 is being inserted over the connector plate 36.

Figure 8B:
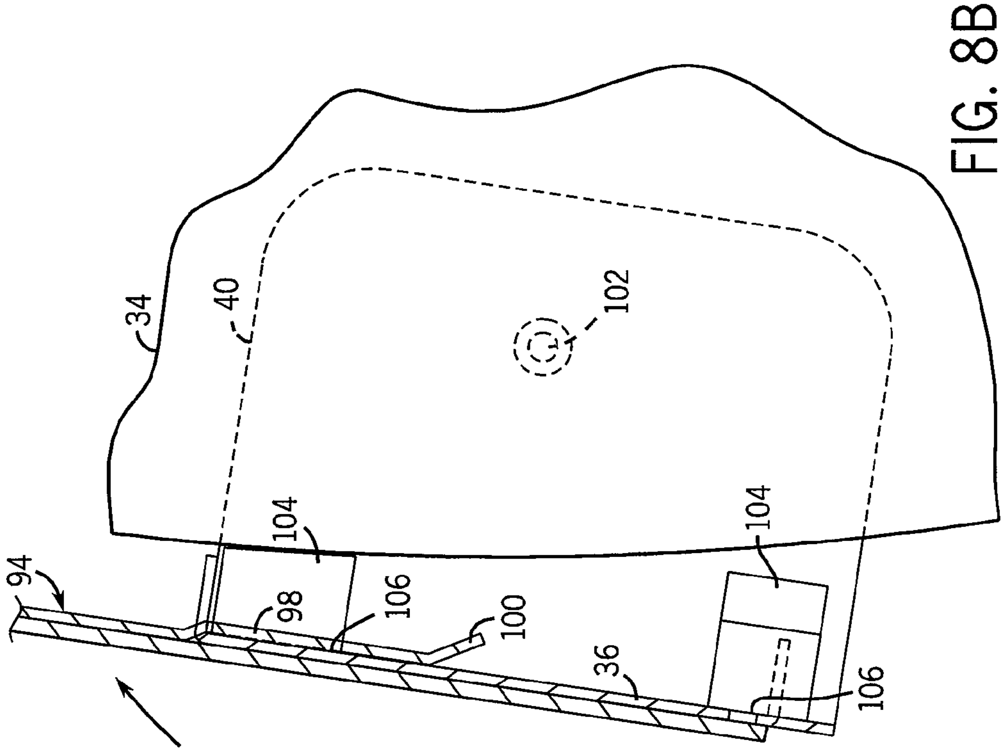
FIG. 8B is a section view similar to FIG. 8A showing the work light mounted to the electric generator at an angle according to another aspect of the present invention.
Figure 8A:
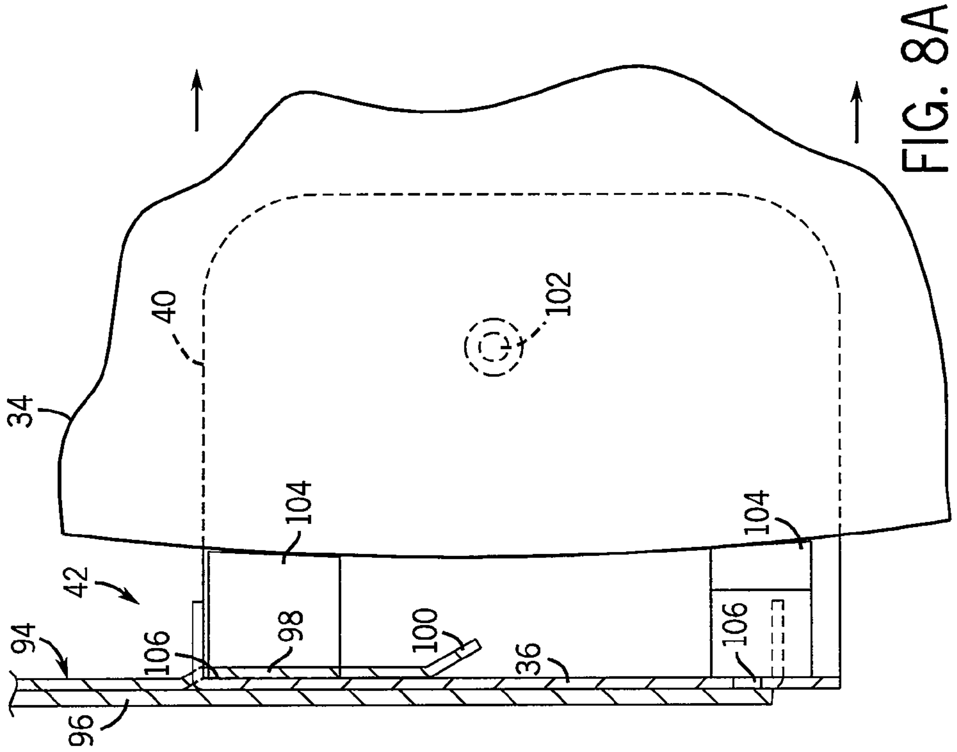
FIG. 8A is a section view of the electric generator with a work light mounted thereto and taken along line 8-8 of FIG. 7.

As noted above, bracket 32 may be mounted to the generator 12 in a manner that enables bracket 12 to pivot, such as illustrated in FIG. 8B. Specifically, pins 102 may have a circular cross section, and mounting arms 40 may have circular openings in which pins 102 are received, so that bracket 32 may be allowed to pivot relative to generator 12.

Engine-driven generators typically vibrate with the resonant frequency of the engine during operation. The pivotable mounting of bracket 32 to generator 12 limits the impact of those vibrations and, in addition cushions 104 may be affixed to the bracket 32. The cushions 104 are secured to the generator-side surface 106 of connector plate 36. In one embodiment, cushions 104 are coupled to connector plate 36 using screws 102, but other coupling mechanisms may be used, such as adhesive. Cushions 104, which may be fabricated from any suitable resilient or other cushioning material, are designed to dampen vibrations directed outwardly through the faceplate 28 during operation of the generator 12. Without cushions 104, the accessory may vibrate when mounted to the generator 12, which may inhibit operation of the accessory. For instance, cushions 104 may reduce flickering of the work light 14 when the generator 12 is running.

Figure 9:
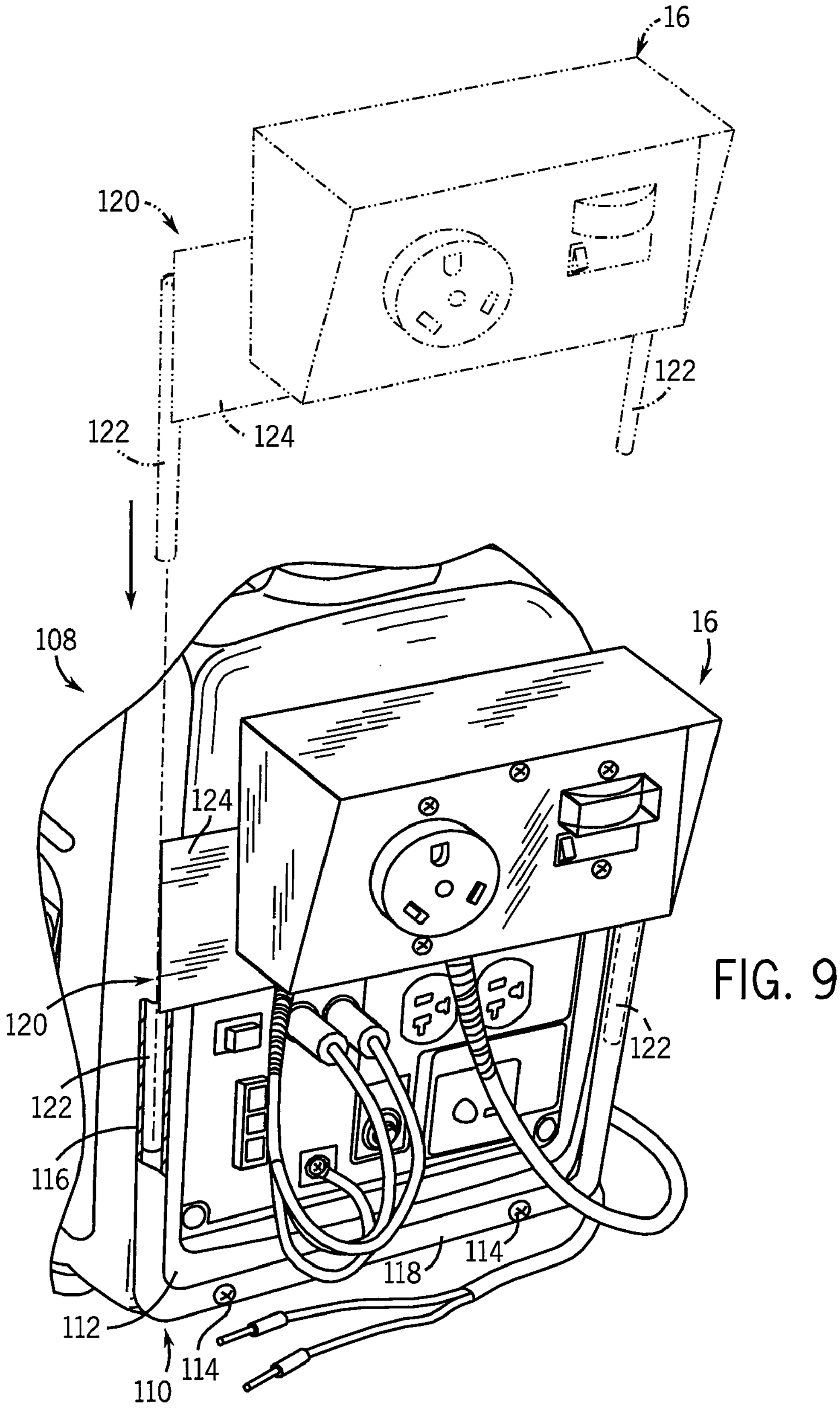
FIG. 9 is a partial isometric view of an electric generator with another accessory, in the form of a parallel connection device, mounted thereon using an alternate mounting structure according to another aspect of the present invention.

FIG. 9 shows another type of structure in accordance with the present invention for mounting an electrical accessory to a generator. In this embodiment, a generator 108 has a U-shaped frame 110 that is fastened to the faceplate 112 of the generator 108 using suitable fasteners 114. The frame 110 is comprised of a pair of posts 116 connected by a support bar 118. Representatively, the electrical accessory shown mounted to generator 108 may be in the form of a parallel connection device 16. The accessory is removably affixed to a mounting bracket 120 in a manner similar to that described above, e.g., by means of clip 94. The mounting bracket 120 consists of a pair of legs 122 coupled to one another by a connector plate 124. The legs 122 are spaced from one another by a distance equal to the distance by which the pair of support posts 116 are spaced from one another. Thus, to mount the electrical accessory to the generator 108, the mounting bracket 120 is slid downwardly such that legs 122 are inserted into posts 116. When the legs 122 are seated in posts 116, the electrical accessory is securely mounted to the generator 108 but in a manner that does not require any tools or fasteners. Similarly, the electrical accessory may be demounted from the generator 108 by withdrawing the legs 122 from posts 116.

In an alternate of this embodiment, the U-shaped frame may have legs that are inserted into posts carried by the mounting bracket.

While this embodiment does not provide the vibration isolation feature as in the prior embodiment, it nonetheless provides a means for quickly and easily securing an accessory to a generator and removing the accessory from the generator.

The present invention has been described in terms of the preferred embodiment, and it is recognized that equivalents, alternatives, and modifications, aside from those expressly stated, are possible and within the scope of the appending claims.

What is claimed is:

1. An electric generator and accessory system for mounting an accessory to an electric generator, comprising:

- a generator that includes a housing;
- an accessory mounting member secured to the housing of the electric generator, wherein the accessory mounting member includes receiver structure;
- a generator accessory separate from the mounting member; and
- an engagement arrangement carried by the generator accessory and separate from the accessory mounting number, wherein the engagement arrangement includes engagement structure; and
- wherein the engagement structure of the engagement arrangement removably engages the receiver structure of the accessory mounting member via slidable movement of the engagement structure onto the receiver structure that secures the engagement structure to the receiver structure without the use of fasteners such that (i) in a mounted position, the engagement structure engages the receiver structure to secure the generator accessory to the generator, and (ii) in an un-mounted position, the engagement structure is disengaged from the receiver structure while the accessory mounting member remains secured to the housing of the electric generator.

2. The electric generator and accessory system of claim 1 wherein the accessory mounting member comprises a bracket that is secured to the housing.

3. The electric generator and accessory system of claim 2 wherein the housing has a faceplate and the bracket is secured to the faceplate.

4. The electric generator and accessory system of claim 2 wherein the bracket is removably coupled to the housing.

5. The electric generator and accessory system of claim 2 wherein the engagement structure includes a mounting clip on the generator accessory, wherein the mounting clip is configured to be slidably engaged with and removed from the bracket.

6. The electric generator and accessory system of claim 1 wherein the housing has a first sidewall and a second sidewall and wherein the accessory mounting member includes a first end coupled to the first sidewall; a second end coupled to the second sidewall; and a transverse member connected between the first end and the second end.

7. The electric generator and accessory system of claim 6 wherein the accessory mounting member is configured such that a space is defined between the housing and the transverse member.

8. The electric generator and accessory system of claim 1, wherein the accessory mounting member is movable relative to the generator housing, and further comprising at least one dampening member between the accessory mounting member and the housing.

9. The electric generator and accessory system of claim 1 wherein the receiver structure comprises a pair of spaced apart upstanding accessory mounting posts and wherein the engagement structure comprises a pair of spaced apart engagement members, wherein each engagement member is engageable with one of the accessory mounting posts for mounting the accessory to the generator.

10. The electric generator and accessory system of claim 1 wherein the generator accessory is selected from a group consisting of a light, a transfer switch, and a parallel connection device.

11. A method of connecting an accessory to an electric generator, comprising the steps of:

- securing an accessory mounting member to a housing of a generator, wherein the accessory mounting member includes receiver structure;
- providing a generator accessory separate from the mounting member, wherein the generator accessory includes an engagement arrangement carried by the generator accessory and separate from the accessory mounting member, wherein the engagement arrangement includes engagement structure; and
- removably securing the accessory to the mounting member without the use of fasteners while the mounting member remains secured to the generator, by slidably moving the engagement arrangement onto the receiver structure.

12. The method of claim 11 wherein the generator accessory is selected from a plurality of different generator accessories.

13. The method of claim 12 wherein the electrical accessories include a work light, a transfer switch, and a parallel connection device.

14. The method of claim 11 wherein the receiver structure includes a pair of spaced apart upstanding accessory mounting posts and wherein the engagement structure comprises a pair of spaced apart engagement members, and wherein the step of removably securing the accessory to the accessory mounting member is carried out by engaging the pair of spaced apart engagement members with the pair of posts.

* * * * *

UNITED STATES PATENT AND TRADEMARK OFFICE

CERTIFICATE OF CORRECTION

PATENT NO. : 8,154,137 B1
APPLICATION NO. : 12/038542
DATED : April 10, 2012
INVENTOR(S) : David D. Flegel It is certified that error appears in the above-identified patent and that said Letters Patent is hereby corrected as shown below:

IN THE CLAIMS

CLAIM 1, column 5, line 60, delete "number" and substitute therefore -- member --.

Signed and Sealed this
Twenty-second Day of May, 2012

David J. Kappos
*Director of the United States Patent and Trademark Office*